United States Patent [19]
Schiettecatte et al.

[11] Patent Number: 5,265,519
[45] Date of Patent: Nov. 30, 1993

[54] RECEPTACLE CONTAINING MILK ADAPTED FOR A CAPPUCCINO ACCESSORY

[75] Inventors: Patrice J. C. Schiettecatte; Justinus T. A. C. Paquay, both of Alencon, France

[73] Assignee: Moulinex (Societe Anonyme), Bagnolet, France

[21] Appl. No.: 15,861

[22] Filed: Feb. 10, 1993

[30] Foreign Application Priority Data

Feb. 10, 1992 [FR] France ............................ 92 01444

[51] Int. Cl.$^5$ .......................................... A47J 31/40
[52] U.S. Cl. ............................. 99/293; 261/DIG. 16; 261/78.1
[58] Field of Search ............... 99/279, 293, 294, 300, 99/302 R, 316, 323, 290, 287; 426/433; 261/78.1, DIG. 16; 126/381

[56] References Cited

U.S. PATENT DOCUMENTS

| | | | |
|---|---|---|---|
| 4,800,805 | 1/1989 | Mahlich | 99/293 |
| 4,852,473 | 8/1989 | Bolivar | 99/293 |
| 4,945,824 | 8/1990 | Borgmann | 99/293 |
| 4,960,042 | 10/1990 | Grossi | 261/DIG. 16 |

*Primary Examiner*—Robert W. Jenkins
*Attorney, Agent, or Firm*—Young & Thompson

[57] ABSTRACT

An accessory for the preparation of a creamy air-milk-steam emulsion to produce Italian cappuccino, is mounted at the end of a steam outlet pipe (2) of an espresso coffee machine. The accessory comprises an aspiration chamber (3) communicating with the steam outlet pipe, a first lateral opening (4) which communicates with a receptacle containing milk, a second lateral opening (5) in communication with the atmosphere, and a third opening (6) through which leaves a first mixture which flows into an emulsion chamber (7) having a first outlet (8). The receptacle containing the milk is integral with the accessory. The invention is applicable to a cappuccino accessory fixed on a steam outlet pipe of a coffee-making machine.

6 Claims, 2 Drawing Sheets

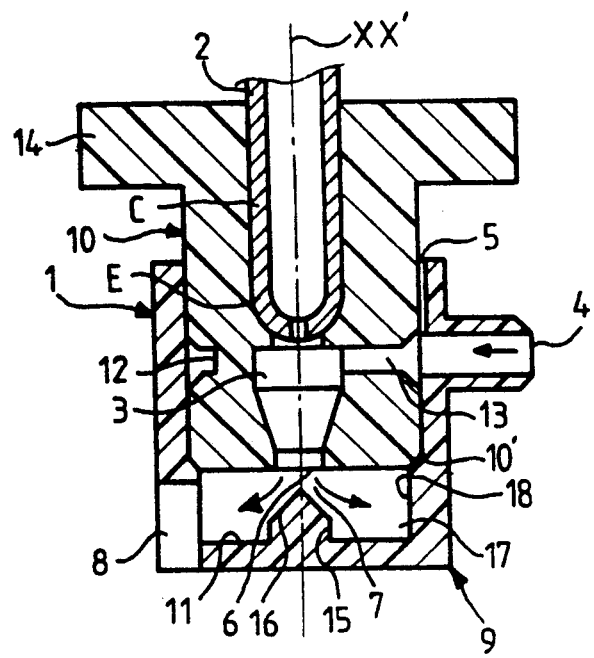
FIG_1
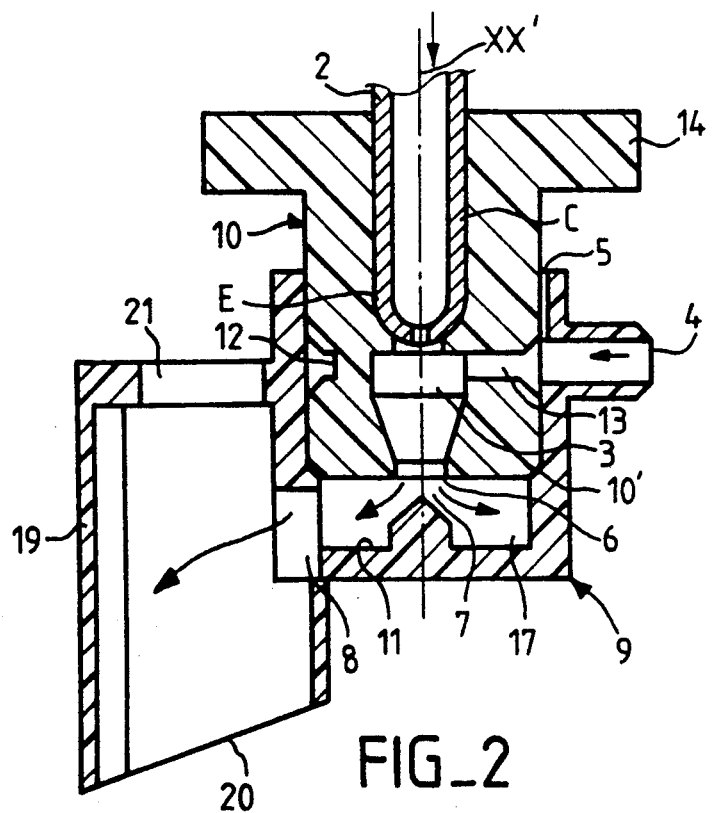
FIG_2

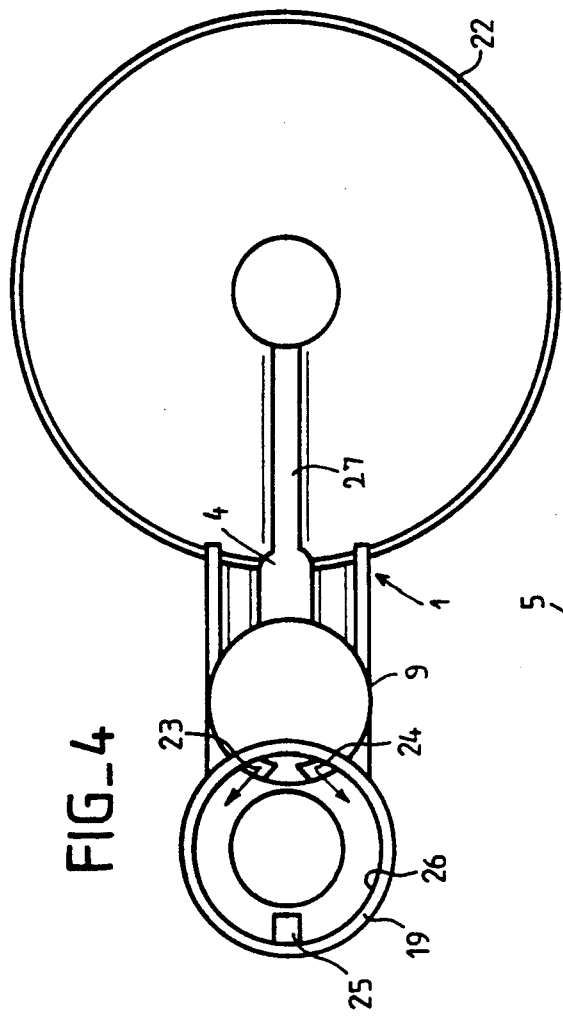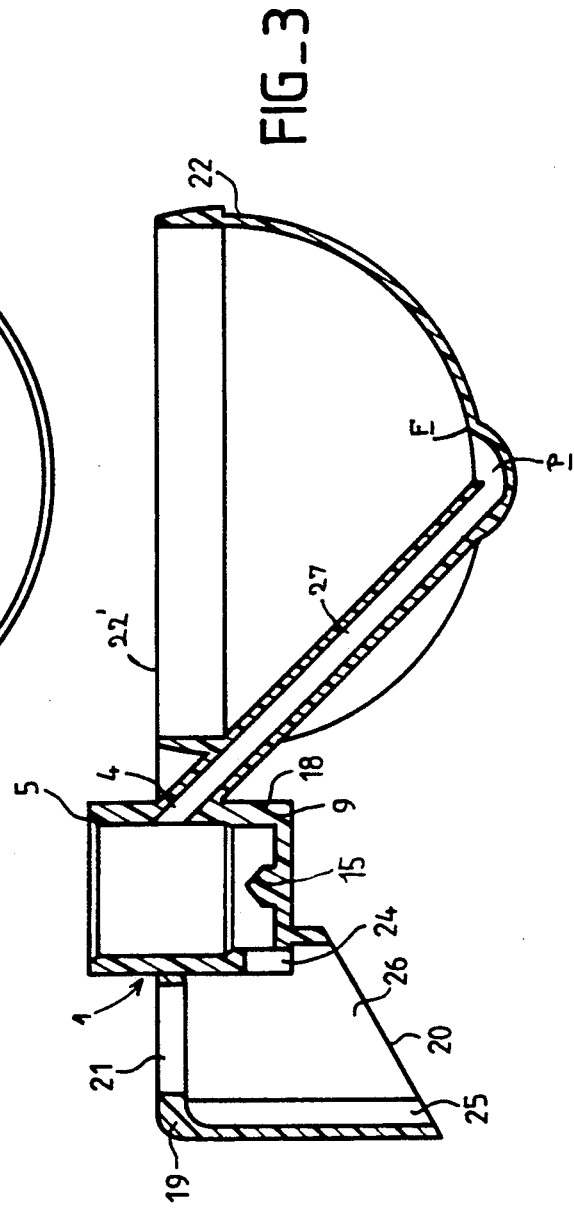

RECEPTACLE CONTAINING MILK ADAPTED FOR A CAPPUCCINO ACCESSORY

The invention relates to an accessory adapted for the end of an output pipe for steam from an espresso coffee machine and permitting forming a creamy air-milk-steam emulsion necessary for the preparation of Italian "cappuccino". The accessory comprises an aspiration chamber connected with the steam output pipe, a first lateral opening which communicates with a receptacle containing milk, a second opening which communicates with the atmosphere, and a third opening by which a first mixture leaves, which flows into an emulsion chamber comprising a first flow means by which said creamy mixture escapes.

Such accessories are well known and are described in numerous documents. One, described in a patent application EP 344,859, is constituted of several rigid pieces interconnected by joints, of anti-projection means and of means conveying air-milk-steam complexes. This accessory is usually connected to the receptacle containing the milk by a flexible tube. Said tube has a first end which is secured to the first side opening of the accessory for cappuccino and its other end which extends into said receptacle so as always to be immersed. Such a tube is cumbersome, difficult to apply and remove and poorly adapted for receptacles with opaque packaging. On the other hand, it is necessary to use a flexible material for said tube and the use of such a tube does not conduce to the creamy emulsion necessary to obtain good cappuccino.

The object of the invention is to overcome the recited drawbacks by providing a cappuccino accessory, easy to emplace, economical and simple to use.

According to the invention, the cappuccino accessory comprises the receptacle containing the milk.

Thanks to the accessory according to the invention, a user can obtain a creamy air-milk-steam emulsion with a single implement, which facilitates the operation. On the other hand, the receptacle being connected to the accessory, the height of the milk level varies little during operation of the accessory, which improves the quality of the creamy emulsion. Finally, the direct connection of the receptacle to the accessory limits the connections and the conveyance of the milk, thereby facilitating cleaning and increasing the cleanliness of said accessory.

The characteristics and advantages of the invention will become apparent from the description which follows, by way of non-limiting example, with reference to the accompanying drawings, in which:

FIG. 1 is a vertical cross section of a cappuccino accessory constituted by a rigid member and a flexible member according to a first embodiment;

FIG. 2 is a vertical cross section of a cappuccino accessory according to a second embodiment;

FIG. 3 is a vertical cross section of a rigid piece of a cappuccino accessory according to the invention;

FIG. 4 is a view from below of the accessory of FIG. 3.

FIGS. 1 and 2 relate to an accessory which has already been described in a French patent application filed by the applicant and which is again described in the present application so as better to understand the invention.

According to FIG. 1, an accessory for the preparation of a creamy air-milk-steam emulsion to produce "cappuccino" is mounted at the end of a steam outlet pipe 2 of an espresso coffee machine (not shown). The accessory 1 comprises an aspiration chamber 3 which is in communication with: the steam outlet pipe 2, a first lateral opening 4 by which milk is injected into the accessory, a second opening 5 in communication with the atmosphere, and a third opening 6 by which a first air-milk-steam mixture leaves, which flows into an emulsion chamber 7 comprising a first flow means 8 by which the creamy emulsion escapes. The accessory 1 comprises a first tubular rigid member 9 having the first opening 4 and the first flow means 8 and partially receiving a second flexible tubular member 10 of elastic material connected at its upper end to the steam outlet pipe 2. The second flexible tubular member 10 comprises the aspiration chamber 3 in communication with the first opening 4 and the second opening 5. The space left between the lower end of the second flexible tubular member 10 and the base 11 of the first rigid tubular member 9 comprises the emulsion chamber 7.

The steam outlet pipe 2 of the espresso coffee machine is sunk in a recess C, provided in the central portion of the second member 10, to come into abutment against a first shoulder E so as not to close the communication of the chamber 3 with the first lateral opening 4 by which the air-milk mixture arrives.

The internal wall 18 of the rigid member 9 comprises a shoulder 10' against which comes into abutment the end of the flexible member 10. In this way, the first rigid tubular member 9 ensures self-gripping on the second flexible tubular member 10 so as to guarantee a good seal between the various openings. The second flexible tubular member 10 also comprises a circular throat 12 recessed in its lateral surface, and into which opens a hole 13, for example, perpendicular to a longitudinal axis XX' of said second flexible tubular member 10, said throat 12 being closed by the internal wall 18 of the rigid wall 9 so as to place the aspiration chamber 3 in communication with the first opening 4. After complete insertion of the second tubular flexible member 10 into the first rigid tubular member 9, the circular throat 12 will be automatically in registry with the first opening 4 communicating with the receptacle containing the milk. To obtain an economical but reliable construction, the first rigid tubular member 9 is, for example, of polyacetaldehyde and the second flexible tubular member 10 is, for example, of silicone. All other flexible or rigid or heat-resistant material could similarly be used.

In the embodiment disclosed in FIG. 1, the second opening 5 serving as the air inlet is, for example, formed by a calibrated groove of a cross section between 0.1 and 0.3 mm$^2$, provided in the internal lateral wall 18 of the first rigid tubular member 9 and interrupting the contact surface between the two members 9 and 10.

The second opening 5 for air inlet can, in another embodiment (not illustrated), be provided in the second tubular member 10.

The upper end of the second flexible tubular member 10 comprises a gripping means, for example, an annular protuberance 14 provided at the external periphery of the upper end of the second member 10. This gripping means facilitates the mounting and unmounting of the accessory thus provided.

The base 11 of the first rigid tubular member 9 comprises a boss 15 situated facing the opening 6 and having at least one sharp edge, for example a conical point 16. This boss is followed by a zone 17 for the accumulation of creamy mixture which flows through the first flow means 8 constituted by at least one hole provided in the lateral wall 18.

The accessory thus disclosed is mounted on the steam outlet pipe 2 of an espresso coffee machine and can operate as soon as the steam valve of the machine is opened. In this way, the steam gushing from the pipe 2 aspirates and entrains, by the venturi effect, the air flowing from the second opening 5 and the milk flowing from the first opening 4 which communicates with a receptacle containing milk. A first air-milk-steam mixture forms in the aspiration chamber 3. The aspiration chamber 3 has, for example, an inverted truncated conical shape so as, on the one hand, to channel the first mixture against the boss 15 of the rigid member 10, and, on the other hand, to promote the aspiration into said chamber. Said first mixture is projected into the emulsion chamber 7 against the point of the cone 16 of the base 11 of the first rigid tubular member 9. Because of this, the stream of the first mixture is broken up into a multitude of droplets forming a new slender jet of large surface. This new jet strikes the base 11 of the lateral wall 18 of the first rigid tubular member 9 and mixes vigorously with a portion of the mixture already retained in the accumulation zone 17 so as to produce a good emulsion. In this way a creamy mixture comprised of a fine and abundant foam flows through the first flow means 8.

According to FIG. 2, in which certain references designate the same elements as those shown in FIG. 1, the accessory 1 for the preparation of a creamy mixture comprises at least one anti-splash means 19 positioned at the outlet of the first flow means 8. In another embodiment (not shown), two anti-splash means are secured on the rigid member 9 and thus permit obtaining a two-cup distributor. In the illustrated embodiment, the anti-splash means 19 is, for example, a cylindrical chamber integral with the first tubular rigid member 9. Said chamber 19 comprises an outlet opening for foam 20 through which escapes the creamy emulsion needed for cappuccino and positioned, for example, in the lower portion of said chamber 19 as well as an excess steam outlet opening 21 positioned, for example, in its upper part. The lower part of the outlet opening 20 has, for example, a shape that is cut off on the bias so as to promote good flow of the creamy emulsion to a single point.

The invention illustrated in FIGS. 3 and 4 uses certain reference numerals to designate the same elements as those shown in FIG. 1. The accessory 1 for the preparation of a creamy emulsion comprises to one side a receptacle 22 adapted to contain milk and whose bottom F is connected by a channel 27 to the first lateral opening 4. The bottom F of the receptacle 22 comprises for example a depression forming a low point P to which is connected the channel 27. In this way, during operation of the accessory with the juxtaposed receptacle containing milk, any aspiration of air and therefore any loss of prime is avoided. The receptacle 22 has, for example, a small capacity, but nevertheless sufficient to obtain at least one complete cup of cappuccino. Receptacle 22 in the form of a bowl is produced, for example, by molding in a single piece with the first rigid tubular member 9, the molding is preferably effected from a rigid plastic material In another embodiment (not shown), and so as to reduce the size and facilitate cleaning, the receptacle 22 can be attached to the first rigid tubular member 9 by securement means such as, for example, a hook, a clip or a bayonet connection. So as to begin more easily the pumping of the milk through the oblique channel 27, the upper edge 22' is located at substantially the same level as the first opening 4, so that when the user fills the receptacle with milk, all that is needed is a very weak aspiration in the chamber 3 to begin the withdrawal of the milk, which is very useful at the beginning of the operation when the steam jet from the pipe 2 is very weak.

The first rigid tubular member 9 comprises, for example, two lateral holes 23 and 24 serving as flow means and oriented in a direction tangential to the internal side wall 26 of the chamber 19. The chamber 19 comprises a transverse lug 25 positioned on the interior of the lateral wall 26 of the chamber 19, extending substantially over all the height of the chamber 19 and disposed opposite the lateral holes 23 and 24. Thus, the creamy air-milk-steam mixture issuing from the oblique holes 23 and 24 follows a circular path shown by the arrows in FIG. 3, and strikes the lug 25. This creamy mixture flows along the lug 25 and is thus collected in a cup or any other receptacle without splashing.

As a result, the movement imposed on the creamy mixture promotes the separation of the steam from the creamy emulsion.

What is claimed is:

1. In an accessory for the preparation of a creamy air-milk-steam emulsion to produce cappuccino, adapted to be mounted on the end of an outlet pipe for steam (2) of an espresso coffee machine and comprising an aspiration chamber (3) communicating with the steam outlet pipe (2), a first lateral opening (4) which communicates with a receptacle containing milk, a second lateral opening (5) communicating with the atmosphere, and a third opening (6) through which leaves a first mixture which flows into an emulsion chamber (7) comprising a first flow means (8) through which escapes said creamy emulsion; the improvement wherein the receptacle containing the milk is integral with the accessory.

2. Accessory for the preparation of a creamy air-milk-steam emulsion, according to claim 1, wherein the receptacle containing the milk is positioned laterally relative to the accessory and communicates directly with the first lateral opening (4).

3. Accessory for the preparation of a creamy air-milk-steam emulsion, according to claim 1, wherein the bottom (F) of the receptacle (22) is connected by a channel (27) to the first lateral opening (4).

4. Accessory for the preparation of a creamy air-milk-steam emulsion, according to claim 1, wherein the bottom (F) of the receptacle (22) comprises a depression forming a low point (P) to which is connected the channel (27).

5. Accessory for the preparation of a creamy emulsion, according to claim wherein the receptacle containing the milk (22) is integral with a first rigid tubular member (9) having the first lateral opening (4) and in which is partially sunk a second flexible tubular member (10), the first rigid tubular member (9) and the second flexible tubular member (10) forming the accessory.

6. Accessory for the preparation of a creamy emulsion, according to claim 5, wherein the first rigid member (9) and the receptacle (22) are molded in a single piece.

* * * * *